No. 845,803. PATENTED MAR. 5, 1907.
A. N. MANROSS.
STEP HANGER.
APPLICATION FILED NOV. 22, 1906.
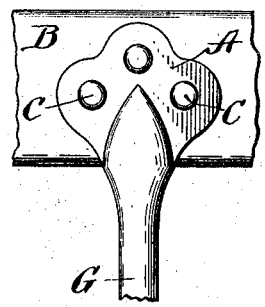
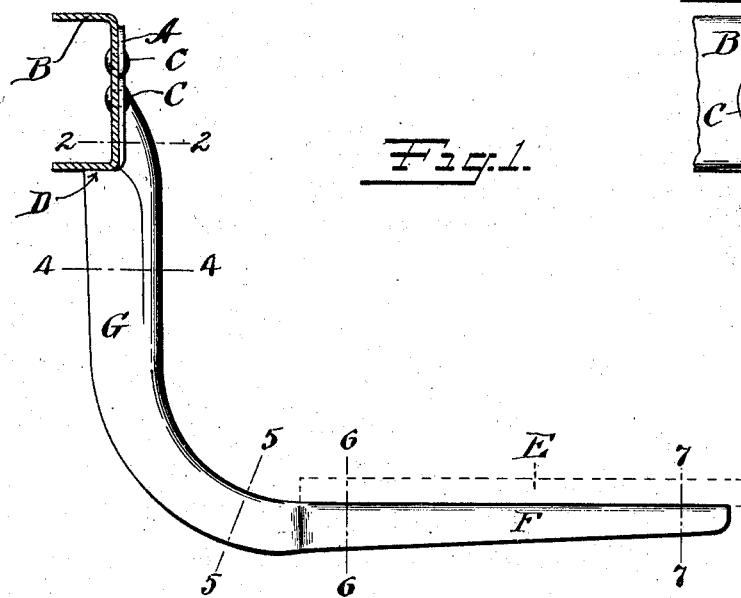
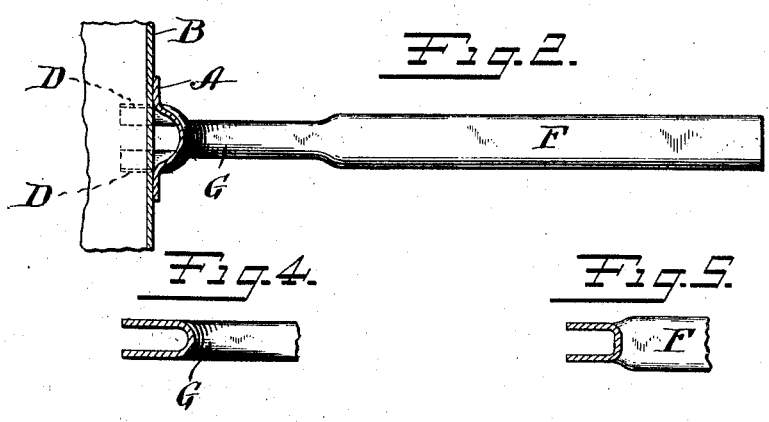
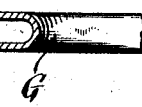 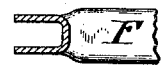
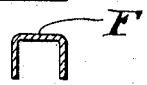 
Witnesses
Chas. W. Pond
L. Vreeland
Inventor
A. N. Manross
By his Attorneys
Bantur Bromwell Mitchell

UNITED STATES PATENT OFFICE.

ARTHUR N. MANROSS, OF NEW BRITAIN, CONNECTICUT, ASSIGNOR TO CORBIN MOTOR VEHICLE CORPORATION, OF NEW BRITAIN, CONNECTICUT, A CORPORATION OF CONNECTICUT.

STEP-HANGER.

No. 845,803.      Specification of Letters Patent.      Patented March 5, 1907.

Application filed November 22, 1906. Serial No. 344,558.

*To all whom it may concern:*

Be it known that I, ARTHUR N. MANROSS, a citizen of the United States, residing at New Britain, county of Hartford, Connecticut, have invented certain new and useful Improvements in Step-Hangers, of which the following is a full, clear, and exact description.

My invention relates to improvements in brackets or hangers for steps and the like.

The object is to provide a light, inexpensive, and yet strong and effective construction.

The invention is of particular value when used in connection with vehicles such as automobiles, where maximum strength with minimum weight is at a premium.

In the drawings, Figure 1 is a side elevation of the bracket in place. Fig. 2 is a plan view, partly in section, on the line 2 2 of Fig. 1. Fig. 3 is a front elevation of the upper part or head of the bracket. Fig. 4 is a section on the line 4 4 of Fig. 1. Fig. 5 is a section on the line 5 5 of Fig. 1. Fig. 6 is a section on the line 6 6 of Fig. 1. Fig. 7 is a section on the line 7 7 of Fig. 1.

The bracket or step-hanger shown in the drawings is preferably made of wrought or sheet metal. A is a head portion of suitable contour and size to enable it to be securely fastened to the main support B. In this instance the main support represents the sill of a vehicle.

C C are the fastening devices by which the bracket is secured in place.

D D are rearwardly-extending shoulders which take a firm bearing underneath the support B. These shouldered portions are formed by bending back the opposite sides of the metal forming the bracket, so as to produce when viewed in section a U-shaped channel, the two opposite sides of the channel constituting reinforcing or strengthening webs. The crown or arch of this channeled portion projects into a plane above or out of line with the plane of the head A, while the web portions of shoulders D D project on the opposite side of said plane. By this means great rigidity and strength is afforded, not only throughout the length of the bracket, but also at that point adjacent the support B. The main body of the bracket is indicated at G, and this part is in the form of a depending limb gradually curved outwardly into a substantially horizontal plane to form the bearing F for the step proper. The step is indicated by dotted lines at E. In the preferable construction the two sides or webs in the main body portion G are brought relatively close to each other, so as to give relatively greater width to each web, thereby supplying a maximum strength to resist bending strains.

That part of the hanger upon which the step rests is flattened out, which tends to space the web apart relatively more than at the body portion. The flattening out of the part F affords a broad firm bearing for the step proper and prevents undue wear of the same. So, also, this broad bearing will prevent the tilting of the step on the bracket when the same is properly secured. By this construction, as already indicated, the maximum strength is provided with a minimum of weight.

What I claim is—

1. A step-hanger comprising a body portion arched in cross-section forming oppositely-arranged strengthening-webs, the lower part of said body being curved outwardly into a substantially horizontal plane to provide a step-support, a head portion at the upper end of said body portion arranged to be secured to a main support and a rearwardly-extending bearing-shoulder below said head.

2. A step-hanger or bracket comprising a main body portion arched in cross-section to form oppositely-arranged strengthening and reinforcing webs, said body portion being gradually curved out toward the lower end into a horizontal plane to provide a step-support, said webs being spaced apart at the step-supporting portion a greater distance than at the body portion, and a head at the upper end of said body portion arranged to be secured to a main support and oppositely-arranged bearing-shoulders just below and to the rear of said head portion.

3. A bracket or step-hanger comprising a main body portion arched in cross-section to form two oppositely-arranged reinforcing-webs, a head portion at the upper end of said body portion arranged to be secured to the side face of a suitable support, shoulders on said body portion arranged to bear against the under side of said support, said body portion having an outward projection or extension near its lower end to act as a step-support.

4. In a step-hanger or bracket a body portion comprising a depending part gradually curved outwardly to form a substantially horizontal step-support, said body and step-support being arched or channeled throughout to form oppositely-arranged reinforcing-webs, a head portion at the upper end of the body arranged to be secured to a suitable main support and two oppositely-arranged bearing-shoulders just below and projecting to the rear of said head.

5. In a step-hanger or bracket a body portion comprising a depending part gradually curved outwardly to form a substantially horizontal step-support, said body and step-support being arched or channeled throughout to form oppositely-arranged reinforcing-webs, a head portion at the upper end of the body arranged to be secured to a suitable support, the rearwardly-projecting shoulders on said body arranged to take a bearing against the under side of said support.

ARTHUR N. MANROSS.

Witnesses:
WM. V. COLLINS,
G. ERNEST ROOT.